United States Patent [19]

Maki

[11] Patent Number: 4,515,281

[45] Date of Patent: May 7, 1985

[54] RADIO-CONTROLLED SKYLINE CARRIAGE

[76] Inventor: William Maki, Star Rte. 60, Pierce, Id. 83546

[21] Appl. No.: 400,761

[22] Filed: Jul. 21, 1982

[51] Int. Cl.³ ............................................. B66C 21/00
[52] U.S. Cl. ...................................... 212/76; 212/89; 212/122
[58] Field of Search .................... 212/71, 76, 117–122, 212/92, 94; 104/93, 112, 173 R, 178

[56] References Cited

U.S. PATENT DOCUMENTS

| 569,400 | 10/1896 | Balch | 105/30 |
|---|---|---|---|
| 2,790,561 | 4/1957 | Wyssen | 212/122 |
| 3,083,839 | 4/1963 | McIntyre | 212/89 |
| 3,247,933 | 4/1966 | Hanna | 212/122 |
| 3,776,390 | 12/1973 | Junes et al. | 212/122 |
| 3,844,419 | 10/1974 | Holmes | 212/122 |
| 3,863,774 | 2/1975 | Brandt | 212/122 |
| 4,127,197 | 11/1978 | Dumont | 212/122 |
| 4,164,289 | 8/1979 | Haliewicz | 212/122 |
| 4,238,038 | 12/1980 | Fikse et al. | 212/89 |

Primary Examiner—Trygve M. Blix
Assistant Examiner—Stephen P. Avila
Attorney, Agent, or Firm—Seed and Berry

[57] ABSTRACT

A carriage for moving logs along a suspended skyline includes a pair of skyline wheels which rotate as the carriage moves along the skyline to drive a pair of alternately operating pumps which supply hydraulic pressure to a carriage hydraulic system. A first larger pump operates as the carriage moves uphill, while a second smaller pump operates when the carriage moves downhill. The carriage hydraulic system powers a driven hydraulic sheave and pressure roller for paying out a mainline. A skyline clamp is applied by a hydraulic ram and includes cammed surfaces which ride over a roller to ensure that the carriage will remain clamped to the skyline should the ram lose hydraulic pressure.

7 Claims, 6 Drawing Figures

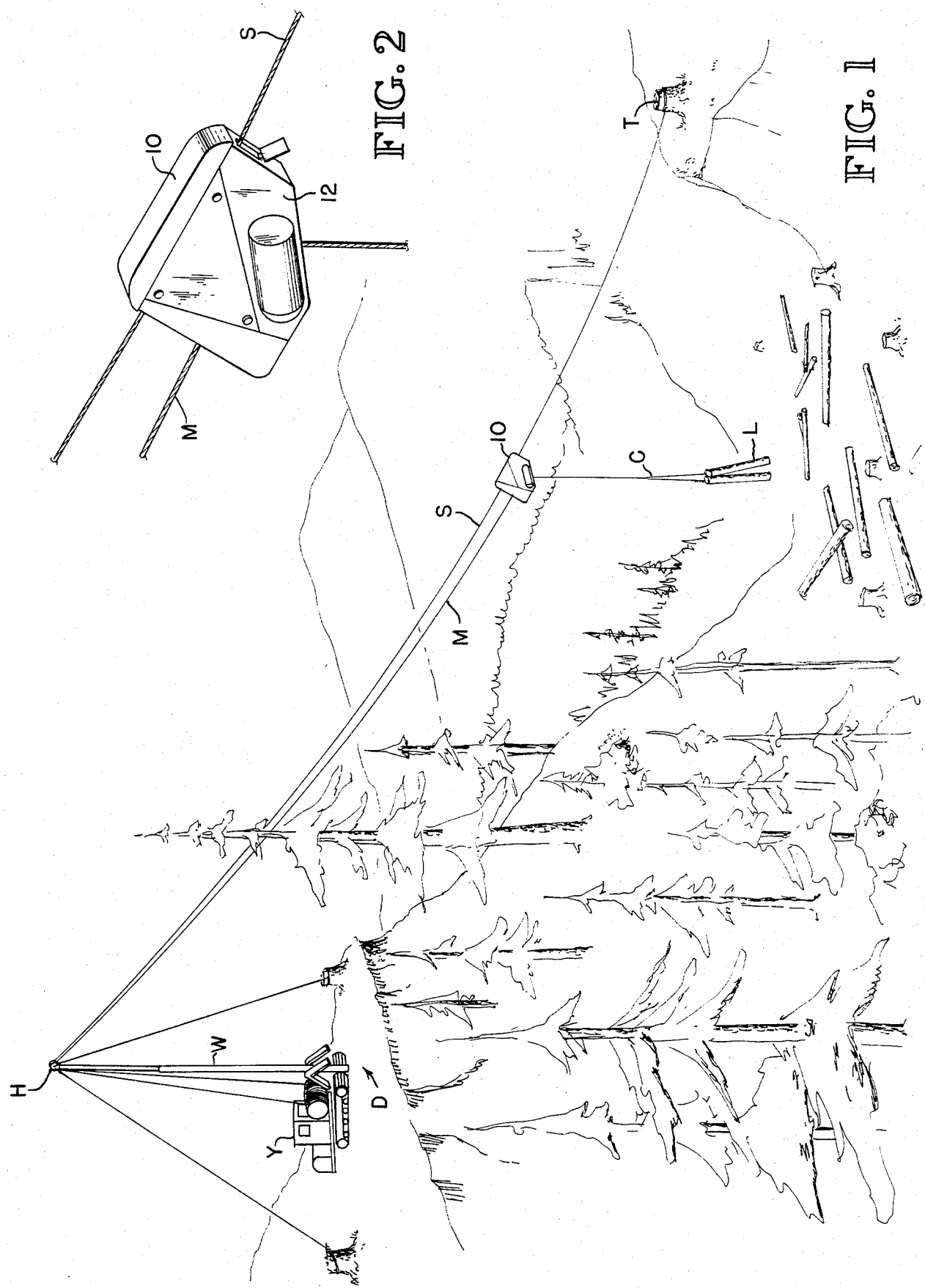

RADIO-CONTROLLED SKYLINE CARRIAGE

DESCRIPTION

TECHNICAL FIELD

This invention relates to logging equipment, more particularly to an improved radio-controlled skyline carriage.

BACKGROUND ART

While a traditional concern of any logging operation is the efficient transportation of felled timber from a forest to processing plants, modern logging planners are also concerned with minimizing safety hazards and environmental damage resulting from such operations. Thus, while clear-cutting timber may be the most "efficient" way to log a forest, logging planners may opt to selectively harvest timber because of environmental or timber management concerns.

It is important, therefore, that modern logging equipment be designed with the broadened concerns of logging planners in mind. Ideally, logging equipment will be adaptable for use in either clear-cutting or selective harvesting situations. Additionally, it is desirable to use logging equipment which will minimize the disruption of the soil in the area being logged. Such disruption can often result in excessive soil erosion, which will not only be detrimental to the forest land but can adversely impact aquatic life forms in nearby streams.

After timber is harvested, the resulting logs are transported to a landing. A landing is a generally level area, situated near a logging road, from which logs are loaded on trucks and hauled to processing plants. The act or process of conveying logs to a landing is known as "yarding." When timber is harvested on grades of less than 25–35%, tractors or other heavy equipment, such as skidders, may be used for yarding. Such equipment is generally efficient only at haul distances below 1,000 feet and works best in clear-cutting operations. When harvesting steeper slopes or hauling over longer distances, some type of cable yarding system is often employed.

One such system is a skyline system. In a skyline system, a cable known as a skyline is stretched taut between two spars to extend over sloped terrain. A carriage equipped with grooved wheels rides on the skyline to carry logs to a landing positioned near one of the spars. A second cable, known as the mainline, extends from the uphill spar to the carriage. The mainline is reeled in to pull the carriage uphill and paid out as the carriage moves downhill due to gravity.

To operate a skyline system, the carriage is lowered to a desired location on the skyline and secured in place. Chokers or grapple hooks are lowered from the carriage and attached to nearby logs. Once the logs are attached to the chokers or grapple hooks, they are raised up to the carriage and the carriage is moved either uphill or downhill to a landing, where the logs are lowered and released.

The skyline is usually elevated at at least one location. When logging a concave slope, for example, the uphill spar is normally elevated by a portable tower, while the downhill spar is secured to a tree trunk or the like, as shown in FIG. 1. Elevating the skyline allows the logs to be transported to the landing without dragging them on the ground. This procedure makes it easier to pass over ground obstacles and lessens environmental damage by minimizing soil disruption caused by dragging the logs over the ground.

An important characteristic of a skyline system is its lateral reach, or yarding width. To set up a skyline system for operation, a corridor beneath the skyline must be clear-cut to create a passageway to transport logs to the landing. Areas on either side of this skyline corridor can be selectively harvested, however. If the lateral reach of the choker or grapple hooks is too short to cover a given area, one or both spars must be relocated and a new skyline corridor cut, thus lessening the percentage of the area which can be selectively harvested. Setting up additional spar locations is also time-consuming and inefficient, even if the skyline system is being used to clear-cut an entire area.

Thus, a skyline system which will function well for both clear-cutting and selective harvesting must have adequate lateral reach. Existing skyline systems use a variety of cable arrangements to rig the chokers to provide adequate lateral reach. Some systems, for example, include a spool of cable mounted inside the carriage which is reeled in or paid out to raise or lower the chokers. The spool may be coupled to a pair of mainlines for rotation.

Another arrangement involves passing the mainline through the carriage and using it to raise and lower the logs. When this arrangement is used, some sort of slack pulling device is usually needed to ensure that when the mainline is paid out at the uphill spar, it will extend through the carriage and lower the chokers rather than merely drooping between the uphill spar and the carriage. One type of slack pulling device is a driven mainline sheave, which is positioned on the carriage and will help pay out the mainline. These mainline sheaves can be driven by hydraulic motors on the carrier itself. Such slack puller systems often include a pressure roller positioned adjacent the main line sheave to force the main line against the main line sheave and thereby aid in paying out the main line through the carriage. Conventional pressure rollers are freely rotating devices, and even with the aid of such pressure rollers, the main line may sometimes droop between the carriage and the spar rather than paying out properly.

For a skyline system to operate properly, it is necessary to have a safe and reliable method of stopping the carriage at a desired location along the skyline so that logs can be picked up and transported to the landing. One existing method is to use a "stopper" to prevent movement of the carriage beyond a desired point. A "stopper" is a device which rides along the skyline and may be manually clamped at any location along the skyline to prevent passage of the carriage beyond such location.

Another method of stopping the carriage is by means of a clamp which is positioned on the carriage itself. Such clamps may be hydraulically actuated, such as the one disclosed in U.S. Pat. No. 4,164,289. In any hydraulically actuated clamp, it is important to have some sort of backup system so that the carriage will not begin to move along the skyline if the hydraulic pressure in the carriage system drops. Such movement can be particularly dangerous to workers rigging the logs.

Hydraulically controlled components, such as a skyline clamp or a mainline sheave, are particularly advantageous because they can be operated by radio control. Radio-controlled devices often reduce the manpower requirements of a logging crew as well as eliminate the need for additional equipment, such as cables running to the carriage or separate stoppers to stop the carriage. Additionally, radio-controlled devices allow the log riggers to quickly and accurately control the carriage functions. Such an arrangement is not only more efficient, but will be much safer as well, as a rigging crew need not signal a distant operator to halt carriage operations in case of an emergency. In order to take advantage of all the hydraulic and remote control possibilities on a skyline system, there must be a means to provide adequate pressure to a hydraulic system within the carriage. Existing systems use a single pump coupled to the skyline wheels to pressurize the carriage hydraulic system. As the carriage moves up and down the skyline, the skyline wheels rotate. By coupling this rotation to the pump, the carriage hydraulic system can be pressurized. If the pump selected is too small, however, inadequate system pressure will be developed to operate the hydraulic components. On the other hand, if the pump is too large, it will resist rotation of the skyline wheels and they will merely skid down the skyline without rotating when the carriage is not loaded with logs. Under these conditions, the carriage hydraulic system is only being pressurized when the carriage is moving uphill with a load of logs. Thus, pump size is currently something of a compromise between choosing a pump which will be small enough to operate under all conditions and choosing one which will be large enough to take advantage of the full pumping capacity of a loaded carriage.

It can be seen, therefore, that there is a need for a skyline carriage with a hydraulic system with sufficient pressurizing capacity to operate a plurality of carriage components, such as clamps and slack pullers. Additionally, there is a need to provide hydraulically actuated components which will function safely should hydraulic pressure be lost. There is also a need for a hydraulically actuated slack pulling mechanism which will adequately eliminate drooping problems.

DISCLOSURE OF INVENTION

It is an object of this invention to provide a skyline carriage which will work well in both clear-cutting and selective harvesting situations.

It is another object of this invention to provide such a hydraulic carriage which can safely function with a radio-controlled hydraulic system for clamping the carriage to the skyline.

It is another object of this invention to provide such a carriage which will remain clamped to the skyline if hydraulic pressure is lost in the hydraulic system.

It is another object of this invention to provide a skyline carriage with a hydraulic system therein capable of providing maximum pressure within the hydraulic system.

It is another object of this invention to provide a skyline carriage having a hydraulic system pressurized by the rotation of the skyline wheels which will eliminate slipping of the skyline wheels.

It is another object of this invention to provide such a skyline carriage which will improve conversion of the kinetic energy of the skyline carriage as it travels on the skyline to stored energy within the hydraulic system.

It is another object of this invention to provide a skyline carriage having a main line which extends through the skyline carriage and an improved slack puller mechanism for reducing drooping when such main line is paid out.

There and other objects, which will become more apparent as the invention is more fully disclosed below, are obtained by providing a radio-controlled skyline carriage which includes a hydraulic system for actuating a plurality of carriage components. A pair of rimmed skyline wheels are mounted on the carriage to permit the carriage to ride along the skyline. Adequate lateral reach is preferably provided by a single mainline which extends from the uphill spar through the carriage and includes chokers on the downhill end for securing logs to the main line.

The fluid for the carriage hydraulic system is pressurized by a pair of alternately operating pumps which are powered by the rotation of the skyline wheels as the carriage moves along the skyline. The skyline wheels are preferably coupled to one another so that both skyline wheels drive the pumps. As a result, a relatively large pump can be used without causing the skyling wheels to slip on the skyline since the area of contact between the wheels and the skyline is twice that of a single skyline. A first one-way clutch coupled to the skyline wheels operates a small capacity pump when the carriage moves downhill. When the carriage moves uphill, a second one-way clutch operates a larger capacity pump.

Pressurized fluid from the pumps is stored in a pair of accumulators for use when the carriage is stopped. Hydraulic pressure from the accumulators is preferably used to operate a skyline clamp, a mainline clamp, and a slack puller mechanism.

To stop the carriage, a radio signal is used to activate the skyline clamp which engages the skyline to secure the carriage to the skyline. The carriage hydraulic system is designed so that when the skyline clamp is activated, the mainline clamp is automatically released and vice versa. The skyline clamp is specially designed to remain engaged should the carriage hydraulic system lose pressure and to automatically release when the skyline carriage is pulled uphill.

Once the carriage is stopped, a radio signal is used to activate a hydraulically powered slack puller mechanism to pay out the mainline. A mainline sheave and driven roller are powered by a hydraulic motor to pay out the mainline. When the mainline is reeled in, a clutch ensures that the slack puller mechanism is disengaged.

The carriage hydraulic system includes a Barksdale switch which will shut off the motor for the slack puller mechanism if the system pressure drops below a predetermined level. This cutoff mechanism assures that there will be sufficient pressure to release the skyline clamp so that the carriage will not inadvertently remain clamped at a single location on the skyline.

BRIEF DESCRIPTION OF THE DRAWINGS

FIG. 1 is a perspective view illustrating a skyline logging system set up for yarding over sloped terrain.

FIG. 2 is an isometric view of a preferred embodiment of the skyline carriage of this invention with the carriage cover in place.

BEST MODE FOR CARRYING OUT THE INVENTION

Figure 3:
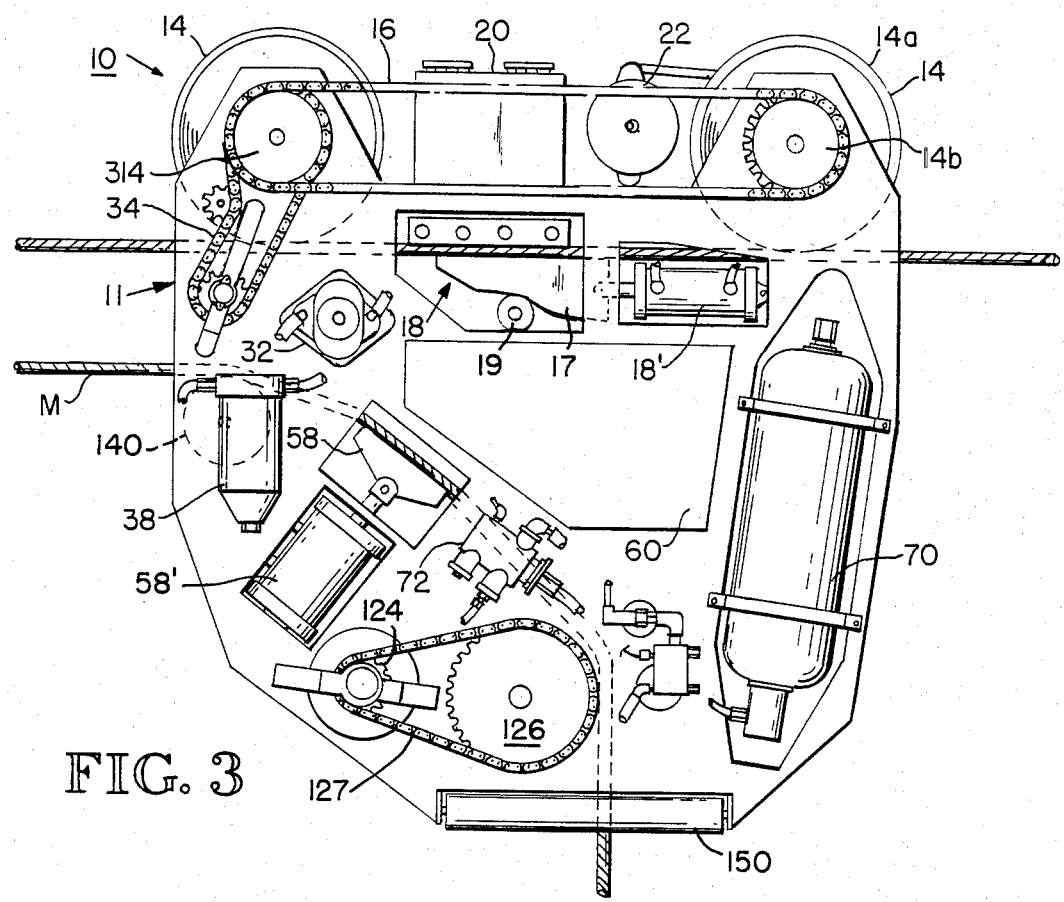
FIG. 3 is a side elevation view of the left side of a skyline carriage shown with the cover removed.

A skyline cable system for uphill yarding is illustrated in FIG. 1. Although the invention is described herein in an uphill yarding environment, it will be readily apparent to those of ordinary skill in the art that the skyline carriage of this invention will also function for downhill yarding. As seen in FIG. 1, a skyline S originates from a spool on a yarder Y and extends from a headspar H to a tailspar T. The hardspar H is elevated by a portable tower W located on the yarder Y. A skyline carriage 10 comprising a preferred embodiment of the invention moves along the skyline S to transport logs L to a landing D positioned near the yarder Y. A mainline cable M originates from a second spool on the yarder Y and extends from the headspar H through the carriage 10.

To transport logs using the skyline system, the carriage 10 is lowered to a desired working location by paying out the mainline cable M from the yarder Y while the mainline cable M is clamped to the carriage 10 by a hydraulically actuated mainline clamp 58. When the carriage 10 arrives at the desired working location, the carriage is clamped to the skyline S by an hydraulically actuated skyline clamp 18 and the mainline clamp 58 is released. The mainline cable M is then paid out from the yarder Y with the aid of a slack puller assembly 110 (described in detail below) as needed to reach the logs to be transported. Chokers C positioned on the end of the mainline cable M are used to secure logs to the mainline cable M. Once the logs are secured to the mainline cable M, the mainline cable M is preferably reeled in by the yarder Y until the logs are high enough to clear ground obstacles and avoid unnecessary soil disruption. Once the logs L have been raised, the mainline clamp 58 is engaged and the skyline clamp 18 disengaged. The logs L can then be transported uphill to the landing D by reeling in the mainline cable M. When the carriage 10 is over the landing D, the skyline clamp 18 is re-engaged and the mainline clamp 58 is disengaged. The logs L are then lowered to the landing D by paying out the mainline cable M.

As best seen in FIG. 2, the carriage 10 is preferably protected by a metal cover 12 during operation. The metal cover 12 is preferably comprised of a number of removable pieces which enclose the body 11 of the carriage 10 to protect the carriage components from damage during use.

Figure 4:
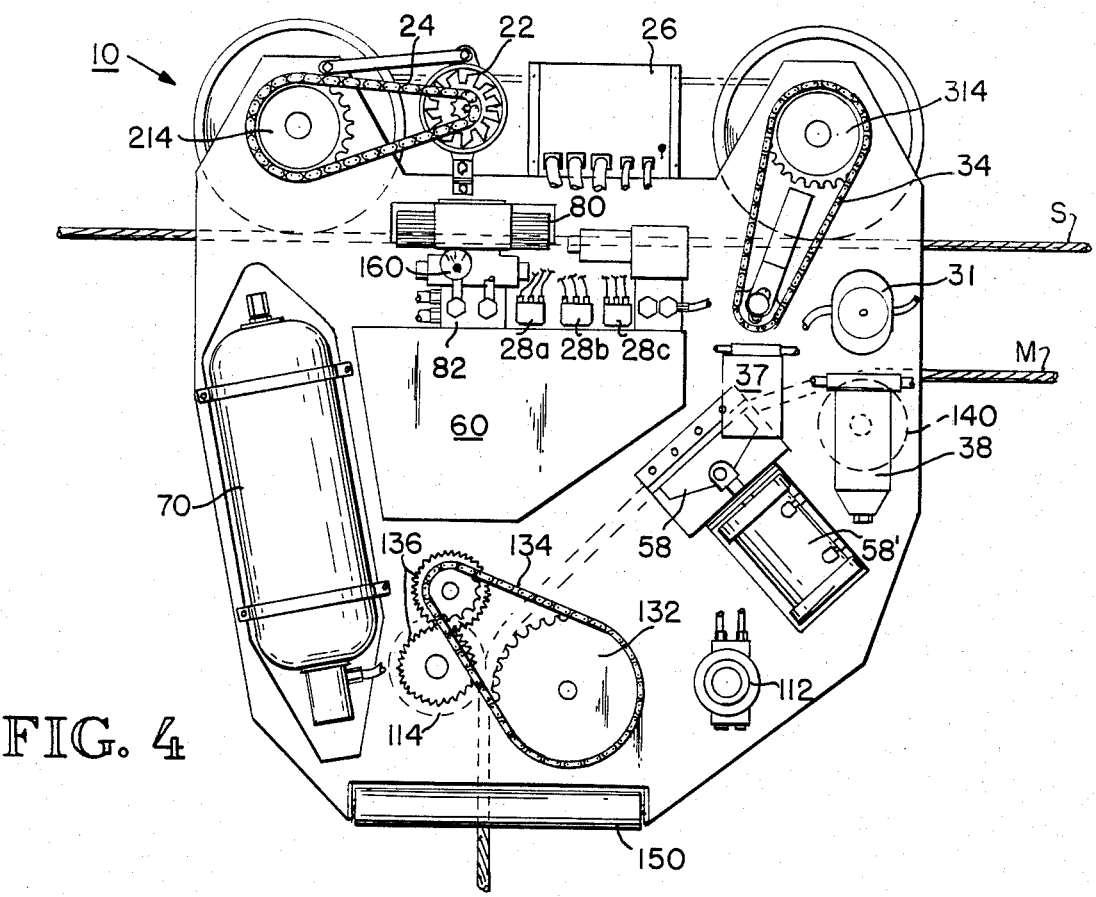
FIG. 4 is a side elevation view of the right side of a skyline carriage shown with the cover removed.

FIGS. 3 and 4 show the carriage 10 with the cover 12 removed and are helpful in understanding the operation of the carriage and its components. The front of the carriage in both these figures is assumed to be the uphill side where the skyline S and mainline M enter the carriage 10. The carriage 10 includes a body 11 through which a skyline S passes. The carriage 10 is suspended from the skyline S by a pair of skyline wheels 14 that are rotatably mounted on the carriage body 11. The outer portion of each skyline wheel 14 defines a rim 14a which engages the skyline S, causing the skyline wheel 14 to rotate as the carriage moves along the skyline. Each skyline wheel 14 includes a coupling sprocket 14b which is mounted along the main portion of the skyline wheel 14, as seen in FIG. 3. A coupling chain 16 extends between the coupling sprockets to couple the skyline wheels 14 for rotation.

As the carriage 10 moves along the skyline S, the rotation of the skyline wheels 14 is used to energize a carriage electrical system and a carriage hydraulic system. A battery 20 within the carriage electrical system is charged by an alternator 22 which is coupled to the rotation of the skyline wheels 14 by an alternator chain 24 and alternator sprocket 214 located on the skyline wheels 14. The alternator sprocket 214 is preferably mounted alongside the rearmost skyline wheel 14 on the side of the carriage opposite the coupling sprocket 14b. The battery 20 is used to power a radio receiver 26 for receiving remotely transmitted signals from a carriage operator. Signals received by the radio receiver 26 activate relay switches 28a, 28b, 28c, completing electrical connections between the battery 20 and the solenoid switches 80, 90 to activate various hydraulic components as described below.

The carriage hydraulic system is pressurized by a pair of alternately operating pumps 31, 32 which are preferably mounted on the carriage near the front skyline wheel 14, as seen in FIGS. 3 and 4. Pump sprockets 314 mounted on each side of the front skyline wheel 14 are rotatably coupled to the pumps 31, 32 by pump chains 34. When the pump sprocket 314 rotates, the pump chain 34 rotates the impeller of the pump 31, 32, causing the pump 31, 32 to draw hydrualic fluid from a reservoir 60 and pressurize it for use in activating the various hydraulic components.

One-way clutch assemblies (not shown) interface the pump sprockets 314 with the skyline wheels 14 such that a first pump 31 will operate when the skyline wheels 14 rotate clockwise and a second pump 32 will operate when the skyline wheels 14 rotate counterclockwise. The first pump 31 is of larger capacity than the second pump 32, and consequently, more torque is required to operate it. When the carriage 10 is transporting a load of logs uphill to a landing, the weight of the logs is transmitted to the skyline S through the skyline wheels 14. This load keeps the skyline wheels 14 in contact with the skyline S and enables the skyline wheels 14 to propel a larger capacity pump without slipping on the skyline S as the carriage 10 moves. When the carriage 10 travels downhill, it usually carries no load, and if too much torque is required to rotate the pump impeller, the skyline wheels 14 will freeze up and begin to slide down the skyline S without rotating. Consequently, the one-way clutch assemblies are arranged so that the first larger pump 31 operates when the carrige 10 is moving uphill. This arrangement permits increased pressurization of the hydraulic system and pump selection no longer need be a compromise.

Figure 6:
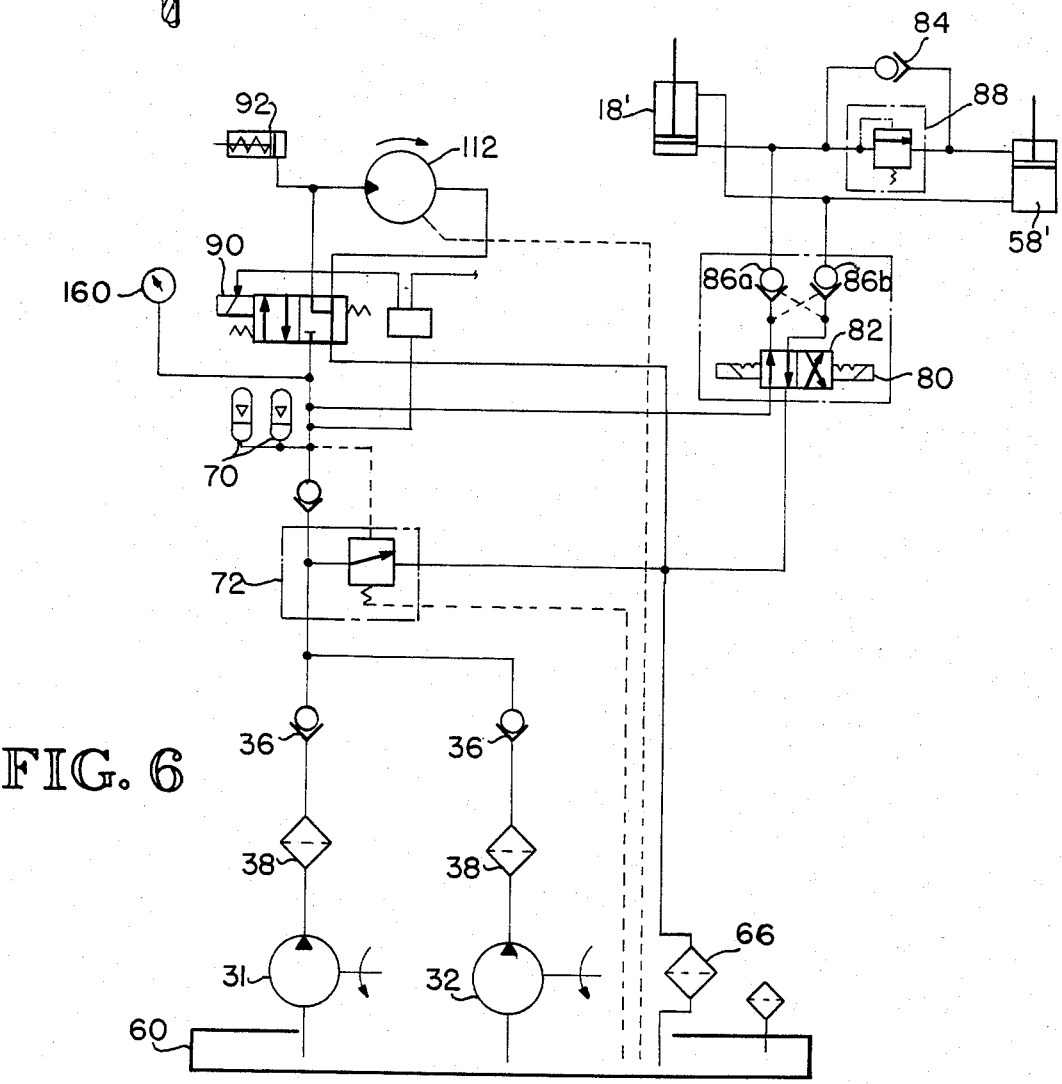
FIG. 6 is a schematic drawing of the carriage hydraulic system.

From the pumps 31, 32, the pressurized hydraulic fluid is passed through filters 38, as seen in the hydraulic schematic of FIG. 6. A check valve 36 is placed in line with each pump 31, 32 to facilitate alternate operation of the pumps 31, 32. After passing through the filter 38 and check valve 36, the pressurized hydraulic fluid is directed into the main portion of the carriage hydraulic system, where it either supplies pressure necessary to operate the hydraulic components or is stored in accumulators 70 for later use. An unloading valve 72 releases pressurized hydraulic fluid from the accumulators 70 to the reservoir 60 when the system pressure reaches undesirable levels. This fluid, as all fluid returning to the reservoir, passes through return filter 66.

Pressurized fluid in the carriage hydraulic system is used to control the skyline clamp 18 and the mainline clamp 58 and to drive the slack puller motor 112. The position of the clamps 18, 58 is controlled by a double solenoid switch 80 which operates a valve 82. As seen in FIG. 6, valve 82 controls the direction of flow toward hydraulic rams 58', 18' which activate the mainline clamp 58 and skyline clamp 18, respectively. A sequence valve 88 and check valve 84 are arranged in parallel to provide alternate flow paths into and out of hydraulic ram 58'. When valve 82 is in the position shown in FIG. 6, pressurized fluid will flow through check valve 86a and begin to actuate hydraulic ram 18', thereby applying the mainline clamp 18. At the same time, pressurized fluid will open sequence valve 88 and begin to retract hydraulic ram 58', thereby releasing the mainline clamp 58. When radio received 28 receives the proper remotely transmitted signal from the carriage operator, it will trip relay switch 28a connecting the battery 20 to solenoid 80, thereby switching valve 82 to an alternate position. When valve 82 is in the alternate position, the flow of pressurized fluid is reversed (as seen in FIG. 6) and the mainline clamp 58 will be actuated while the skyline clamp 18 is released. Another remotely transmitted signal from the carriage operator will trip a second relay 28b to return valve 82 to its original position. Thus, when the skyline clamp 18 is holding the carriage 10 to the skyline S, the mainline cable is is free to move through the carriage 10. When the skyline clamp 18 is released to allow the carriage 10 to move along the skyline S, the mainline M will be clamped in place to ensure that it does not move relative to the carriage 10.

To ensure that the carriage 10 will remain clamped to the skyline S once the skyline clamp 18 is actuated, even should the hydraulic system lose pressure, the skyline clamp is shaped as shown in FIG. 3. Lower clamp bar 17 includes cammed surfaces which ride over roller 19 to push lower clamp bar 17 into engagement with the skyline S. Should the carriage hydraulic system lose pressure, the weight of the carriage will tend to pull the carriage downhill or to the right in FIG. 3. Roller 19 will move rightwardly along with the remainder of the carriage and force the lower clamp bar 17 into engagement with the clamp as it moves over the cammed surfaces of the lower clamp bar.

Figure 5:
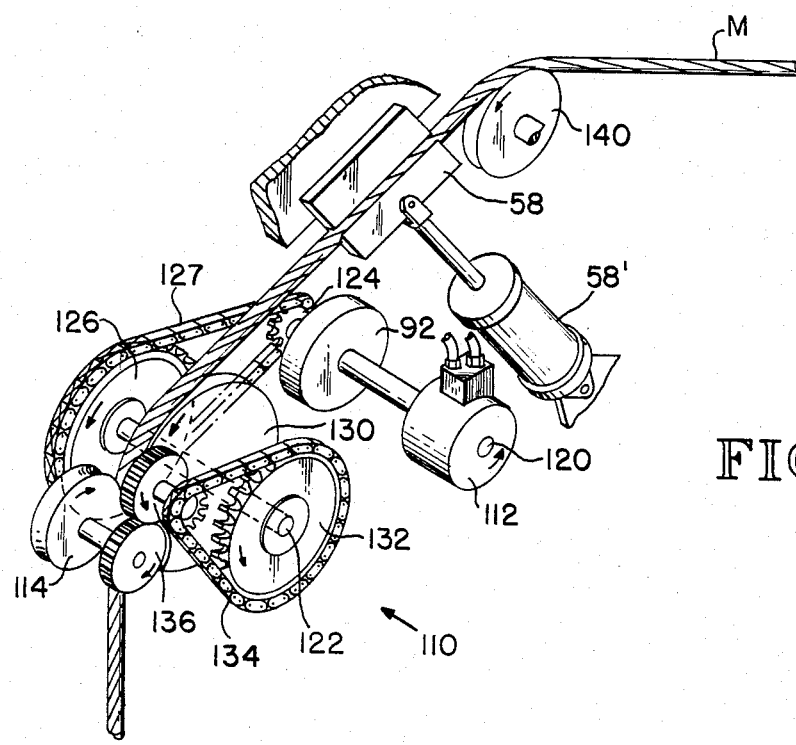
FIG. 5 is an isometric view of the carriage components which surround a mainline cable passing through the carriage shown with the carriage body cut away.

The remaining function of the hydraulic system is to power the slack puller motor 112 which drives the slack puller assembly 110. The slack puller assembly 110 aids in paying out a mainline cable M which is threaded through the carriage 10 over an entry sheave 140 and a mainline sheave 130, as seen in FIGS. 4 and 5. When exiting the carriage 10, the mainline cable M passes between bottom rollers 150, which enable the carriage 10 to be easily transported when on smooth surfaces such as a truck bed. A mainline clamp 58 as described above is used to secure the carriage 10 to the mainline cable M. Upon receipt of remotely transmitted signals from the carriage operator, a third relay 28c activates slack puller solenoid 90 to engage the slack puller motor 112. The slack puller motor 112 causes motor axle 120 to rotate counterclockwise. Motor gear 124 attached to motor axle 120 is linked to sheave gear 126 by chain 127 to cause sheave axle 122 and the mainline sheave 130 mounted thereon to rotate clockwise to assist paying out the mainline cable M which rides over the mainline sheave 130, as seen in FIGS. 4 and 5. An end gear 132 mounted on sheave axle 122 is linked to pinion pair 136 by chain 134 to drive roller 114, as seen in FIG. 5. Roller 114 is positioned adjacent the outer edge of the mainline sheave 130 to engage the mainline cable M. A spring (not shown) is preferably used to bias the roller 114 toward the mainline sheave 130 to ensure that the roller 114 will contact the mainline cable M.

Thus, when the slack puller motor 112 is activated, the mainline sheave 130 and roller 114 are driven by slack puller assembly 110 and engage the mainline cable M to pay it out and prevent drooping of the mainline cable M uphill of the carriage 10. When the mainline cable M is reeled in, jaw clutch 92 permits free rotation of the roller 114 and mainline sheave 130. As the carriage 10 will normally be clamped to the skyline S during operation of the slack puller assembly 110, hydraulic pressure for operation of the slack puller motor 112 is supplied by the accumulators 70. A Barksdale switch 94 monitors the pressure within the hydraulic system and will deactivate the slack puller solenoid 90 to shut off the slack puller motor 112 should the system pressure drop below that necessary to release the skyline clamp 18 and activate the mainline clamp 58. This safety feature ensures that the slack puller motor will not drain the system pressure to such an extent that the carriage will be inadvertently clamped at an undesired location on the skyline S. The system pressure may also be visually monitored by gauge 160 when cover 12 is removed.

Thus, the carriage 10 of this invention provides alternately operating pumps 31, 32 which efficiently pressurize the carriage hydraulic system to provide adequate pressure to operate the carriage components. Additionally, the skyline wheels 14 are rotatably coupled to ensure that the rotating action of both skyline wheels 14 is used to drive the pumps. The carriage 10 also includes a specially designed skyline clamp 18 which will remained clamped should the vehicle lose all pressure. Additionally, a slack puller assembly 110 includes a driven roller 114 and mainline sheave 130 combination for paying out a mainline cable through the carriage 10.

Although the carriage of this invention has been described with respect to a particular embodiment, it is not intended that the invention be limited to this embodiment. Many variations of the invention disclosed herein will be obvious to those of ordinary skill in the art and are intended to be within the scope of the present invention.

I claim:

1. A carriage for moving along a suspended skyline, which comprises:
    a body;
    a pair of skyline wheels rotatably mounted on the body, the skyline wheels rollably suspending the carriage from the skyline when the skyline wheels are placed on the skyline;
    means for receiving remotely transmitted signals;
    a hydraulically actuated carriage component activated by the receiving means; and
    a hydraulic system for supplying hydraulic pressure to the carriage component, the hydraulic system including:
    a reservoir containing hydraulic fluid;
    a first hydraulic pump for pressurizing fluid from the reservoir, the first pump having an impeller coupled to a skyline wheels for rotation when the carriage is moving uphill along the skyline;
    a second hydraulic pump for pressurizing fluid from the reservoir, the second pump smaller than the first pump, the second pump having an impeller coupled to a skyline wheel for rotation when the carriage is moving downhill along the skyline; and an accumulator for storing pressurized hydraulic fluid.

2. The carriage of claim 1 wherein the skyline wheels are coupled to one another for rotation so that when the carriage moves along the skyline both skyline wheels are coupled to the pump impellers.

3. The carriage of claim 1 wherein the carriage component comprises a skyline clamp for releasably securing the carriage to the skyline.

4. The carriage of claim 3 wherein the skyline clamp comprises:
- a first clamping surface positioned on the body adjacent a skyline from which the carriage is suspended;
- a roller mounted on the body on the opposite side of the skyline from the first clamping surface;
- a clamping bar having a second clamping surface adjacent the skyline on the opposite side of the skyline from the first clamping surface, the clamping bar including a cammed surface adjacent the roller, the cammed surface shaped such that when the clamping bar is moved over the roller, the roller will force the clamping bar into engagement with the skyline, thereby clamping the skyline between the first clamping surface and the second clamping surface; and
- a hydraulic ram attached to the clamping bar for moving the clamping bar into and out of engagement with the roller, the hydraulic ram activated by the receiving means.

5. The carriage of claim 1 wherein the carriage is of the type having a mainline passing through the carriage, and the carriage further includes:
- a driven mainline sheave and driven roller adjacent the mainline sheave for engaging the mainline and assisting in paying out the mainline; and
- a hydraulic motor powered by pressurized fluid from the hydraulic system for driving the mainline sheave and mainline roller.

6. A carriage for moving along a suspended skyline, which comprises:
- a body;
- a pair of skyline wheels rotatably mounted on the body, the skyline wheels rollably suspending the carriage from the skyline when the skyline wheels are placed on the skyline;
- means for receiving remotely transmitted signals;
- a hydraulically actuated skyline clamp for releasably securing the carriage to the skyline, the skyline clamp comprising:
  - a first clamping surface positioned on the body adjacent to and above a skyline from which the carriage is suspended;
  - a roller mounted below the skyline;
  - a clamping bar positioned below the skyline, the clamping bar having a second clamping surface on the upper portion thereof for engaging the underside of the skyline; the clamping bar including a cammed surface adjacent the roller, the clamping bar being actuated by a hydraulic ram to move the cammed surface over the roller so that the roller will force the clamping bar upwardly into engagement with the skyline, thereby clamping the skyline between the first clamping surface and the second clamping surface, the roller additionally being located on the uphill side of the carriage with respect to the clamping bar so that in the event of a loss of pressure to the hydraulic ram while the clamping bar is engaging the skyline, any motion of the carriage downhill on the skyline will force the clamping bar into engagement with the skyline, thereby stopping movement of the carriage along the skyline; and
- a hydraulic system for supplying hydraulic pressure to the skyline clamp, the hydraulic system including:
  - a reservoir containing hydraulic fluid;
  - a hydraulic pump for pressurizing fluid from the reservoir, the pump having an impeller coupled to a skyline wheel for rotation when the carriage moves along the skyline; and
  - an accumulator for storing pressurized hydraulic fluid.

7. A carriage for moving along a suspended skyline which comprises:
- a carriage body;
- a pair of skyline wheels rotatably mounted on a carriage body, the skyline wheels rollably suspending the carriage from the skyline when the skyline wheels are placed on the skyline;
- a remotely actuatable skyline clamp mounted on the carriage body adjacent the skyline, the skyline clamp adapted to grip the skyline when actuated so that the carriage will remain stationary with respect to the skyline;
- a mainline passageway extending through the carriage body to allow a mainline to pass through the carriage as the mainline is paid out or reeled in;
- a remotely actuatable mainline clamp mounted on the carriage body adjacent the mainline passageway, the mainline clamp adapted to grip a mainline passing through the mainline passageway to prevent movement of the mainline relative to the carriage;
- a mainline sheave rotatably mounted on the carriage body adjacent the mainline passageway such that a mainline in the mainline passageway will pass through the mainline sheave, the mainline sheave being driven in the direction corresponding to the motion of the mainline when it is paid out to aid movement of the mainline through the carriage;
- a roller rotatably mounted on the carriage body adjacent the mainline sheave and spaced apart from the mainline sheave such that the roller will engage a mainline passing through the mainline sheave and bias the mainline toward the mainline sheave, the roller being driven in the direction corresponding to the paying out of the mainline to further aid movement of the mainline to the carriage; and
- a carriage hydraulic system for supplying hydraulic pressure to the skyline clamp and mainline clamp, the hydraulic system including:
  - a reservoir containing hydraulic fluid;
  - a first hydraulic pump for pressurizing fluid from the reservoir, the first pump having an impeller coupled to the skyline wheels for rotation when the carriage is moving uphill along the skyline;
  - a second hydraulic pump for pressurizing fluid from the reservoir, the second pump smaller than the first pump, the second pump having an impeller coupled to the skyline wheels for rotation when the carriage is moving downhill along the skyline; and
  - an accumulator for storing pressurized hydraulic fluid.

* * * * *